United States Patent
Swift et al.

(10) Patent No.: US 6,844,651 B1
(45) Date of Patent: Jan. 18, 2005

(54) ENCAPSULATED ARMATURE ASSEMBLY AND METHOD OF ENCAPSULATING AN ARMATURE ASSEMBLY

(75) Inventors: Gerald L. Swift, Yaphank, NY (US); Frederick A. Sommerhalter, Jr., Oyster Bay, NY (US); Robert A. Syskowski, Smithtown, NY (US)

(73) Assignee: Anorad Corporation, Shirley, NY (US)

( * ) Notice: Subject to any disclaimer, the term of this patent is extended or adjusted under 35 U.S.C. 154(b) by 32 days.

(21) Appl. No.: 09/870,052

(22) Filed: May 30, 2001

(51) Int. Cl.[7] .............................. H02K 3/48; H02K 3/34; H02K 41/00
(52) U.S. Cl. ........................ 310/214; 310/215; 310/43; 310/45
(58) Field of Search .................................. 310/214, 215, 310/261, 43, 45, 12, 216, 91; 29/596

(56) References Cited

U.S. PATENT DOCUMENTS

| | | | |
|---|---|---|---|
| 3,778,891 A | * 12/1973 | Amasino et al. .............. 29/596 |
| 3,940,647 A | * 2/1976 | Keuper et al. .............. 310/214 |
| 4,749,921 A | 6/1988 | Chitayat |
| 4,950,438 A | * 8/1990 | Nakamura et al. ....... 264/272.2 |
| 6,136,250 A | 10/2000 | Brown |
| 6,218,756 B1 | * 4/2001 | Gardner et al. ............. 310/214 |

* cited by examiner

Primary Examiner—Dang Le
Assistant Examiner—Heba Elkassabgi
(74) Attorney, Agent, or Firm—Amin & Turocy LLP; John M. Miller

(57) ABSTRACT

An armature assembly that may be encapsulated and a corresponding method to encapsulate a motor assembly are disclosed. The armature assembly includes a core having slots in which one or more windings are disposed. An outer covering, such as a thermally conductive thermoplastic material, encapsulates at least a substantial portion of the armature assembly. Some of the encapsulating material extends within the slots so as to facilitate its attachment to the assembly and/or to inhibit movement of the windings relative to their associated slots.

26 Claims, 9 Drawing Sheets

ENCAPSULATED ARMATURE ASSEMBLY AND METHOD OF ENCAPSULATING AN ARMATURE ASSEMBLY

TECHNICAL FIELD

The present invention relates to motors and, more particularly, to an armature assembly that may be encapsulated and to a method of encapsulating a motor, such as within an injection molded material.

BACKGROUND OF THE INVENTION

Various types of motors are partially or wholly encapsulated within a material to help hold its component parts together. The particular material employed to encapsulate the motor may vary depending on the intended application of the motor. In addition, different encapsulation techniques also may be used for different types of motors.

One particular type of motor is a linear motor, such as may include stationary armatures that contain coils and movable stages containing magnets. Alternatively, linear motors can have stationary magnets and moving coils. When the windings are powered, armature heating occurs. The maximum allowable temperature for the armature windings, for example, limits the maximum force obtainable from a linear motor.

Linear motors are increasingly being employed in manufacturing equipment. In such equipment, nominal increases in the speed of operation translate into significant savings in the cost of production. Accordingly, it is often desirable to produce as much force and acceleration as possible in a given linear motor. An increase in force, however, requires either an increase in magnetic field intensity or an increase in current applied to coils of the armature. In a permanent magnet linear motor, for example, the available magnetic field intensity is limited by the field strength of available motor magnets. Power dissipated in the coils generally increases at a rate equal the square of the current. Attendant heat generation tends to limit the force that may be achieved without exceeding the maximum allowable armature temperature.

In a typical linear motor system, the armature assembly includes a coil disposed within a core, such as may be formed of a lamination stack of an electrically conductive material. An epoxy block, for example, is applied via an epoxy mold to encapsulate the armature assembly, which includes a coil and laminated stack. By way of illustration, epoxy is molded around the armature assembly within a mold, which may take upwards of forty-five minutes to sufficiently cure. The encapsulated armature assembly is removed from the mold and trimmed, which trimming may include grinding of part of the epoxy. The mold is then cleaned in preparation of the next molding operation. A typical epoxy molding process thus requires significant time and handling, which tends to increase manufacturing cost.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides an armature assembly. The armature assembly includes a core having a plurality of spaced apart teeth that define slots between adjacent teeth. Windings are disposed in the slots around one or more of the teeth. A retaining structure is operatively associated with the teeth to retain the windings within the slots. The retaining structure includes one or more non-planar surfaces that permit the flow of an encapsulation material into a space located between part of the retaining structure and the windings.

Another aspect of the present invention provides a substantially encapsulated armature assembly. The armature assembly includes a core having teeth that define slots between adjacent teeth. One or more windings are disposed around teeth and within the slots. A retaining system is employed to help hold the windings within the slots. In one particular aspect, the retaining system is configured to permit the flow of encapsulation material into a space located between part of the retaining system and the windings. An outer covering of the encapsulation material covers at least a substantial portion of the armature assembly. For example, some of the encapsulating material may extend into the space adjacent the retaining system and/or within the slots so as to inhibit movement and/or expansion of the windings relative to their associated slots.

Yet another aspect of the present invention provides an armature assembly of a linear motor. The armature assembly includes an elongated core having a plurality of spaced apart teeth that define slots between adjacent teeth. Windings are disposed in the slots around one or more of the teeth. An outer covering of a thermoplastic injection molded material covers at least a substantial portion of the armature assembly. In accordance with a particular aspect, the thermoplastic material has a high thermal conductivity (e.g., greater than about 0.5 W/mK) to facilitate heat transfer from the assembly, such as when windings are energized.

Another aspect of the present invention provides a method for encapsulating a motor. The method includes assembling component parts of the motor. The motor, for example, may include an armature assembly that includes a core having teeth and windings disposed around some of the teeth. The motor is heated. The motor is placed into a heated mold and then a heated encapsulation material is injected into the mold to encapsulate at least a substantial portion of the motor. By way of example, the encapsulation material is a thermally conductive thermoplastic material, such as having a thermal conductivity of greater than or equal to about 0.7 W/mK. After initial curing has occurred within the mold, the motor may be ejected.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides an armature assembly and a corresponding method that may be employed to encapsulate a motor assembly. The armature assembly includes a core having slots in which one or more windings are disposed. An outer covering encapsulates at least a substantial portion of the armature assembly. In one particular aspect, some of the encapsulating material may extend within the slots so as to inhibit movement and/or expansion of the windings relative to their associated slots. A retaining structure also may be provided to help hold the windings in the slots and to facilitate attachment of the outer covering to the assembly.

Figure 1:
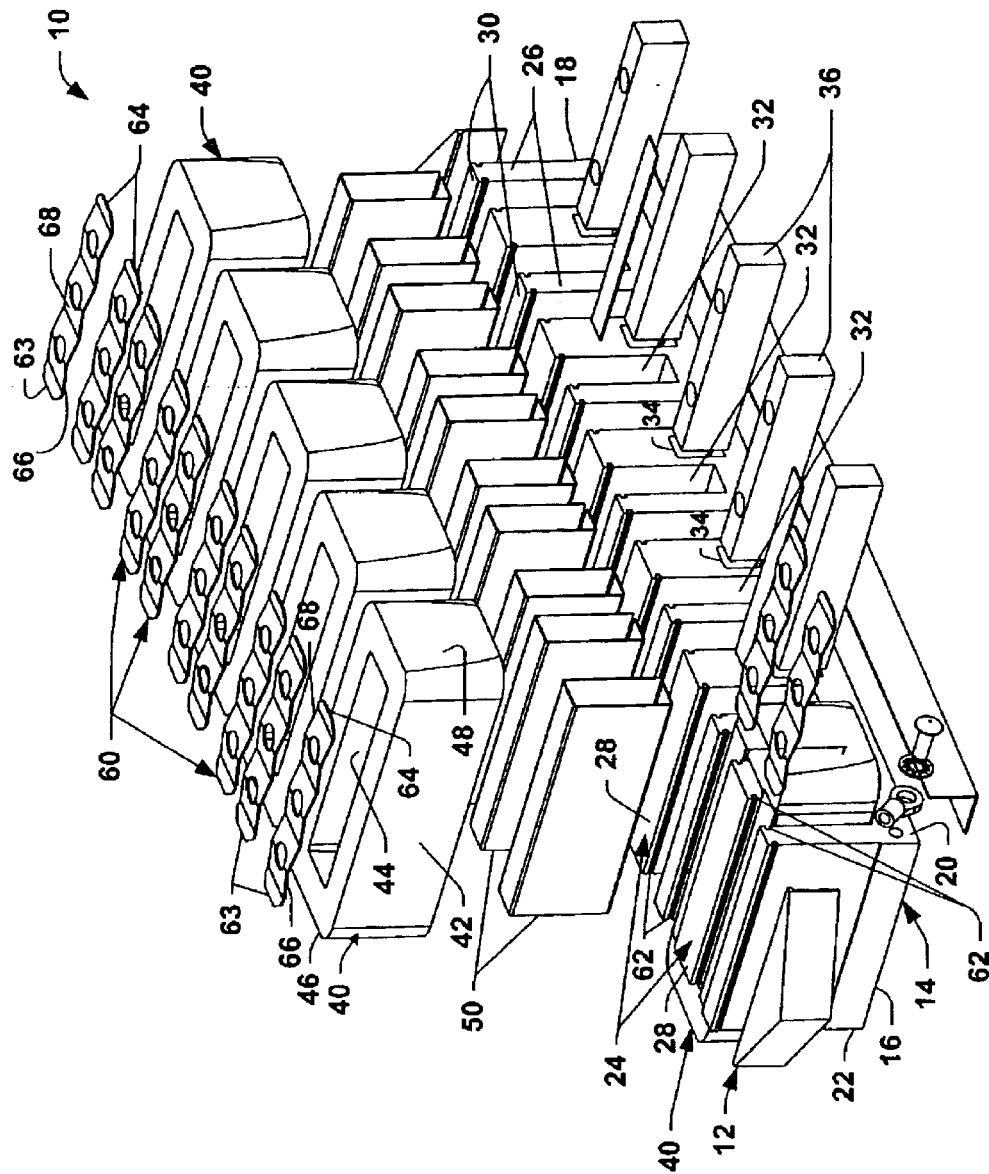
FIG. 1 is an exploded isometric view of an example of a motor assembly in accordance with the present invention.

FIG. 1 illustrates an exploded isometric view of an armature assembly 10 in accordance with an aspect of the present invention. The armature assembly 10 includes a core 12 of an electrically conductive material, such as iron or another suitable material. The core may be formed of a plurality of stacked laminations of the conductive material and/or may be formed of a powdered metal material.

The core 12 includes a base 14 having ends 16 and 18 spaced apart by elongated sides 20 and 22. A plurality of teeth, represented collectively as 24 and 26, extend from a common side of the base 14 and terminate in respective distal ends 28 and 30 spaced from the base. The teeth 24 and 26 further extend longitudinally between the sides 20 and 22 of the base 14. By way of example, the teeth 24 and 26 define planes that extend in a parallel relationship through the teeth, and each adjacent pair of teeth are spaced apart from each other a generally equal distance.

In the example of FIG. 1, some of the teeth 24 have a thickness that is greater than the thickness of the other teeth 26, although it is to be appreciated that other thickness relationships could be utilized. The teeth 24 and 26 are spaced apart and arranged in an alternating relationship between the ends 16 and 18 of the base 14, such that a thick elongated tooth 24 is positioned between each adjacent pair of the thinner teeth 26. The space between each adjacent pair of teeth 24 and 26 provides a volume that defines an elongated slot 32.

An elongated bore 34 may be formed transversely through the core 12, such as including a juncture defined by part of each of the thicker teeth 24 and the base 14. Each bore 34, which may extend completely through the core 12, is dimensioned and configured to receive a rod 36 of a suitable magnetic material. In the example of FIG. 1, the bores 34 and corresponding rods 36 are configured as elongated rectangular cylinders (e.g., having a rectangular cross section). It is to be understood and appreciated that other cross-sectional shapes could be employed for the bores 34 and the rods 36.

The armature assembly 10 also includes armature windings 40 having a plurality of turns of an electrically conductive wire. Typically, the conductive wire includes an insulating material extruded around the wire. The windings 40 are disposed within the slots 32 so as to surround associated teeth 24. In the example of FIG. 1, each of the windings 40 is a pre-wound, bound annular assembly that includes spaced apart and elongated side portions 42 and 44 connected by end portions 46 and 48. The side portions 42 and 44 have a length that is generally coextensive with the length of the teeth 24 between the sides 20 and 22 and are spaced apart from each other a distance that approximates the thickness of the teeth 24. As illustrated in FIG. 1, the windings 40 are disposed around the thicker teeth 24, with the other teeth 26 being interposed between each set of the windings.

It is to be appreciated that as an alternative to pre-wound coil assemblies, the windings 40 could be wound in situ around the teeth 24 and/or 26 during production. The windings also may be non-interlaced. The number of windings 40 may vary according to the application for the motor is designed and/or may vary as a matter or design choice.

To further facilitate the heat transfer capability of the motor, it may be desirable apply an electrical insulating varnish material prior to encapsulating the motor within the injection molded material. By way of illustration, the motor is pre-heated (e.g., in an oven) and then allowed to cool to a temperature of about 150° F. An electrical insulating varnish material is then applied over the motor assembly, such as by immersion into a volume of a suitable varnish material. An acceptable varnish solution, for example, is DOLPHON CC-1305 varnish, which is commercially available from the John C. Dolph Company of Monmouth Junction, New Jersey, although other similar types of materials also could be employed in accordance with an aspect of the present invention. The chamber containing the motor assembly and varnish is then placed in a low pressure (e.g., 1 torr) for a period of time, such as from about thirty minutes to about an hour. The motor can then be removed from the chamber and the remaining varnish drained. The motor assembly is then heated to sufficiently cure the varnish to the motor, such as at temperature of about 375° F. for about two to about three hours. After the injection molded material is applied to the motor, the varnish facilitates heat transfer to the lamination. In addition, the varnish material easily penetrates voids, such as inside the windings, and the spaces between the coil, slot liner, and encapsulation. The varnish also mitigates vibration of the motor components.

Figure 2:
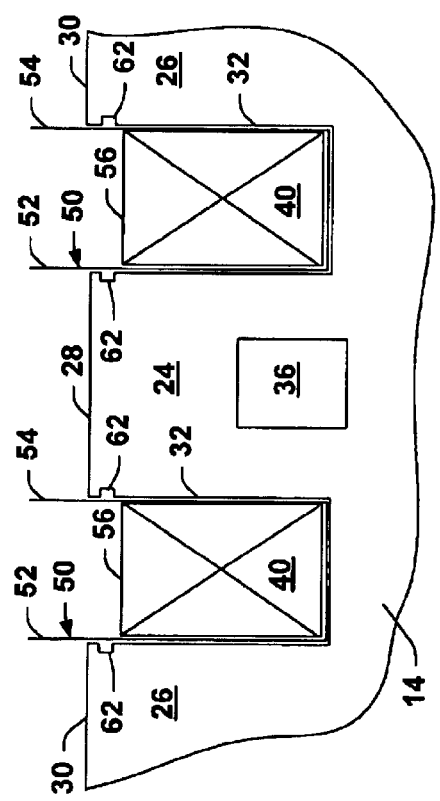
FIG. 2 is a partial sectional view of part of the motor of FIG. 1, illustrating part of a process for constructing the motor in accordance with the present invention.

In accordance with an aspect of the present invention, slot liners 50 are employed to separate the armature windings 40 relative to the core 12. The slot liners 50 are dimensioned and configured according to the dimensions and configuration of the slots 32. In the example shown in FIG. 1, the slot liners 50 extend a length that slightly exceeds the length of the slots 32 (e.g., the liners may be longer than the distance between sides 20 and 22 of the core 12). Each slot liner 50 separates part of a respective winding 40 from the inner surface of the core defined by the slot 32, such as shown in FIG. 2. By way of example, the slot liners may be formed of a flexible insulating material, such as may include a matrix of paper and/or capton. Those skilled in the art will understand and appreciate other suitable materials or coatings that could be utilized to line the slots 32 in accordance with the present invention.

Figure 3:
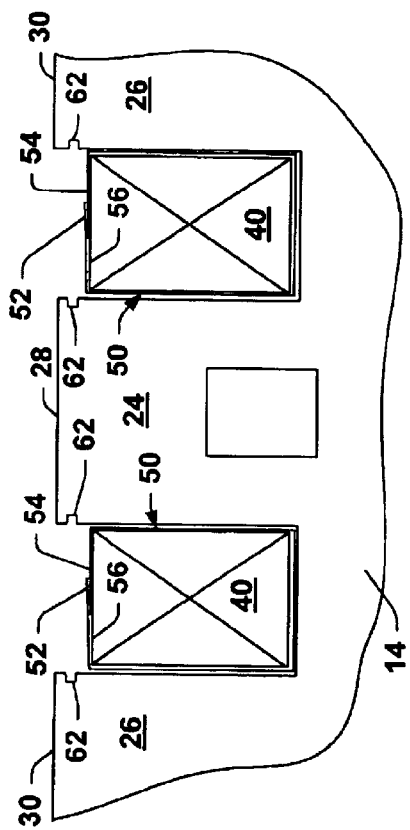
FIG. 3 is a partial sectional view of part of the motor of FIG. 1, illustrating another part of a process for constructing the motor in accordance with the present invention.

Referring to the partial sectional view of FIG. 2, the slot liners 50 may be positioned in each slot as an elongated generally U-shaped member having spaced apart ends 52 and 54. The windings 40 are disposed within U-shaped liners 50 that are positioned within the slots 32. The ends 52 and 54 may extend a distance from the associated slot 32 beyond the ends 28 and 30 of the respective teeth 24 and 26 and beyond an adjacent side 56 of the windings 40. As shown in FIG. 3, the ends 52 and 54 of the slot liner 50 may be folded toward each other and onto the surface 56 of the windings 40. In this way, the slot liner 50 surrounds at least the side portions 42, 44 of the windings 40 located within the slots 32. The overlapping ends 52 and 54 further may permit expansion of the windings 40 without compromising the wrapping provided by the liner 50.

While the example shown and described with respect to FIGS. 2 and 3 illustrates wrapping the slot liner 50 around the windings 40 after being inserted into the slots 32, it is to be appreciated that the suitable liners or coating materials could be applied around the windings prior to being positioned within the slots.

In accordance with an aspect of the present invention, the armature assembly 10 includes a retaining system operative to hold the windings 40 in the slots 32, such as to mitigate movement and/or expansion of the windings 40 relative to the slots.

Figure 4:
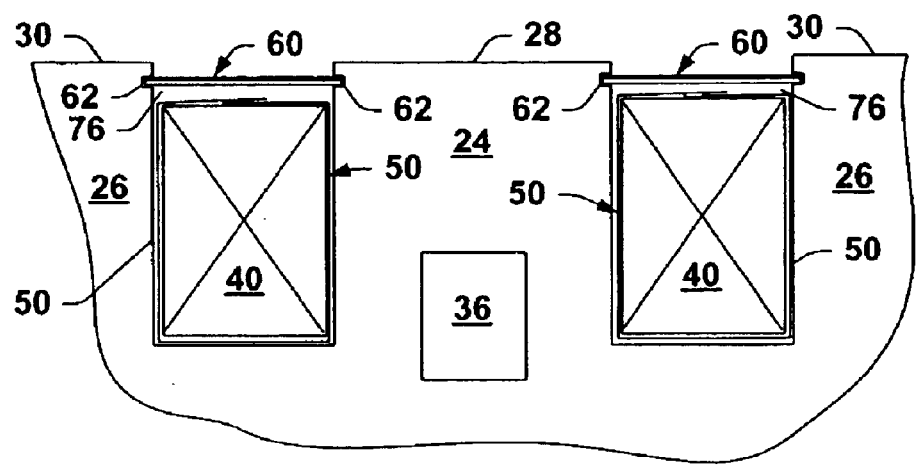
FIG. 4 is a partial sectional view of part of the motor of FIG. 1, illustrating part of a process for constructing the motor in accordance with the present invention.
Figure 5:
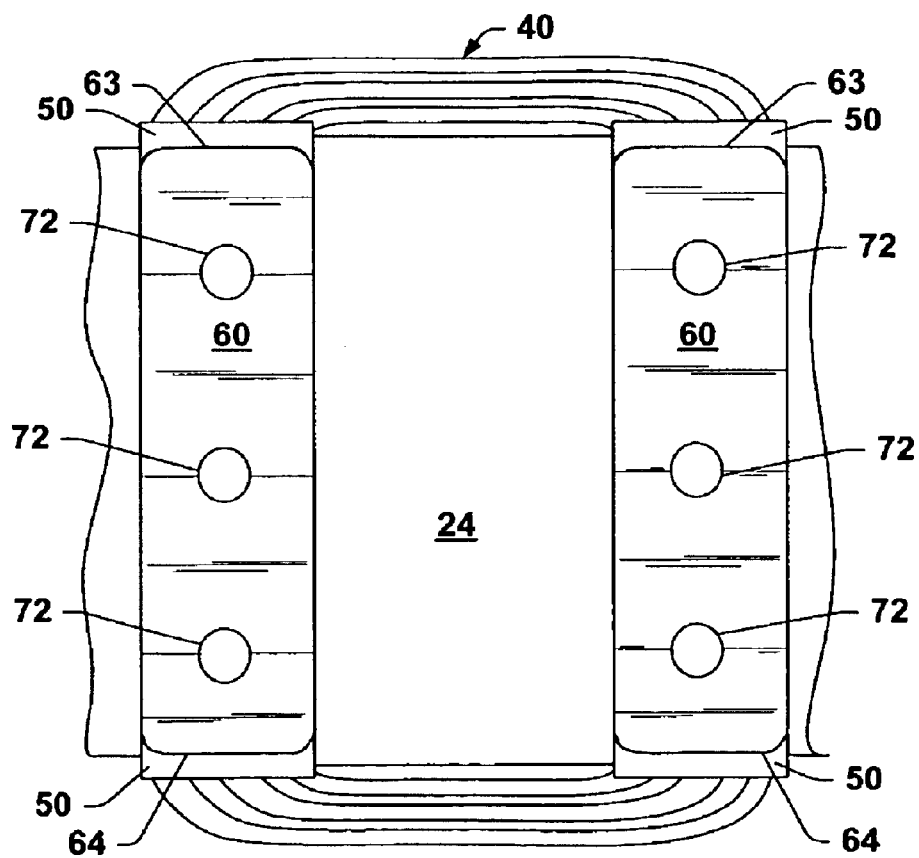
FIG. 5 is a top view of the motor part of FIG. 4.
Figure 6:
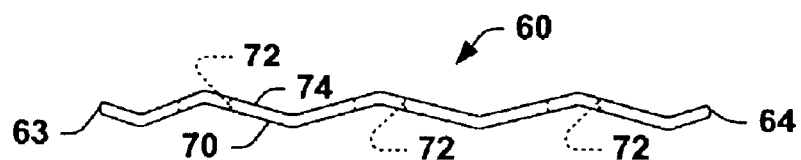
FIG. 6 is a side view of an example of a retaining plate in accordance with the present invention.

By way of illustration FIGS. 1, 4 and 5 depict an example of a retaining system that includes a retaining plate 60 positioned in each of the associated slots 32 near the distal ends 28 and 30 of the respective teeth 24 and 26, respectively. Each plate 60 includes ends 63 and 64 spaced apart by elongated side edges 66 and 68. The distance between the side edges 66 and 68 (e.g., its width) is greater than the slot width and may approximate the transverse distance between grooves. The elongated grooves 62 extend longitudinally through each side of the teeth 24, 26 near their respective distal ends 28, 30, which may be coextensive with the length of the teeth between the side edges. The grooves 62 thus are dimensioned and configured to permit insertion of the plates within respective grooves associated with given slots. The plates 60 further have a length that approximates the length of the teeth adjacent positioned in a pair of adjacent grooves 62, such as shown in FIGS. 1 and 6. The plates 60 may be formed of any substantially rigid material, such as stainless steel.

In accordance with an aspect of the present invention, at least one surface 70 or 74 of each plate 60 is non-planar. As shown in FIGS. 1 and 6, each plate is illustrated as a corrugated plate having a generally saw-shaped or sinusoidal longitudinal cross section, such that both surfaces are non-planar. The non-planar or corrugated configuration further increases the stiffness of the plate 60, so as to better inhibit movement and/or expansion of the windings through the opening at the slots 32. The distance between the upper and lower surfaces 74 and 70 of each plate 60 is dimensioned and configured to permit its insertion into a pair of grooves 62 associated with a respective slot 32. In addition, each plate 60 includes apertures 72 extending through the plate from the lower surface 70 to an upper surface 74 thereof. As described below, the corrugations facilitate the flow of encapsulating material through the apertures 72 and into a space (or void) 76 located between the plate 60 and the windings 40. In addition, the corrugated nature of the plate 60 also permits the flow of encapsulation material into voids formed between the plate and the grooves 62, thereby enhancing attachment between the encapsulation material and the assembly 10.

While, in the example illustrated in FIGS. 1, 5 and 6 the plates 60 are illustrated as having three apertures 72, it is to be appreciated that any number of zero or more apertures could be used. For example, even if the sheet includes no apertures, voids may form between the non-planar upper surface 74 and the sidewall of the grooves 62, which voids permit flow of encapsulation material into the voids. As a result of the encapsulation material residing in the voids, attachment between the encapsulation material and the assembly is facilitated when the material cures. In addition, while the plate 60 has been shown and described as having a varying longitudinal cross section, those skilled in the art will understand and appreciate other retaining mechanisms that could be utilized to hold the windings 40 within the slots 32 and facilitate the flow of material above the windings. For example, an arrangement of detents or voids could be implemented relative the teeth or other associated means that would provide structure to which the encapsulation material could anchor.

Figure 7:
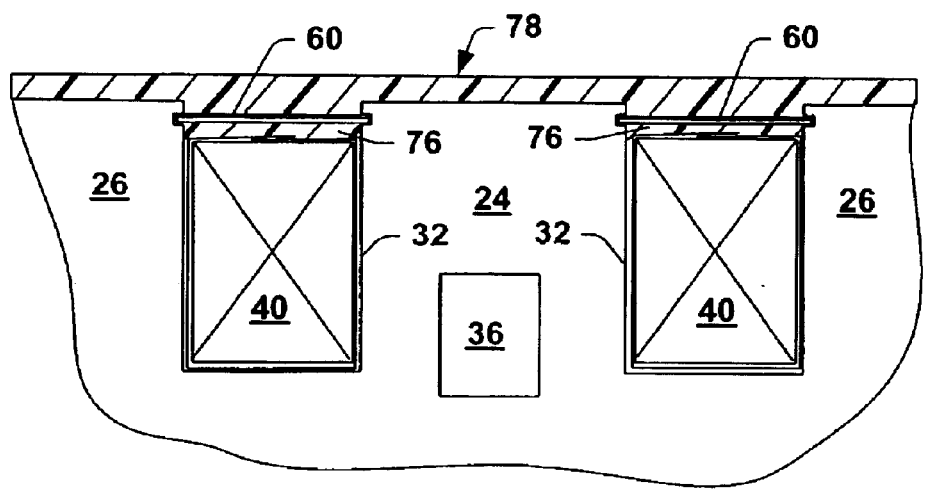
FIG. 7 is a partial sectional view of part of the motor of FIG. 1, illustrating an encapsulation material applied to the motor part of FIG. 4 in accordance with the present invention.

FIG. 7 illustrates an encapsulating material 78 applied over part of the armature assembly 10 in accordance with an aspect of the present invention. As mentioned above, the apertures 72 (FIG. 6) in the retaining plates 60 facilitate the flow of the encapsulating material 78 into the spaces 76 between the plates and the windings 40.

By way of example, the encapsulating material 78 is a thermally conductive material operative to facilitate heat transfer from the armature assembly, such as may be generated when its windings are energized. Such material also provides a generally rigid enclosure when cured around the armature assembly. The material 78, for example, may have a thermal conductivity of greater than or equal to about 0.5 W/mK, such from about 1.0 W/mK to about 10 W/mK, or greater.

In accordance with a particular aspect, the encapsulating material 78 is a thermally conductive thermoplastic material that is injection molded around the armature assembly 10. For example various thermoplastic compounds exist that include thermally conductive fillers, such as carbon powder, carbon fiber, stainless steel, conductive polymers and metal-coated graphites, etc. Suitable thermally conductive plastic materials (e.g., the Konduit™ plastic material) are commercially available from LNP Engineering Plastics Inc. of Exton, Penn. and from Cool Polymers Inc of Warwick, R.I. Those skilled in the art will understand and appreciate other acceptable thermally conductive compounds that may be utilized in accordance with the present invention.

Figure 8:
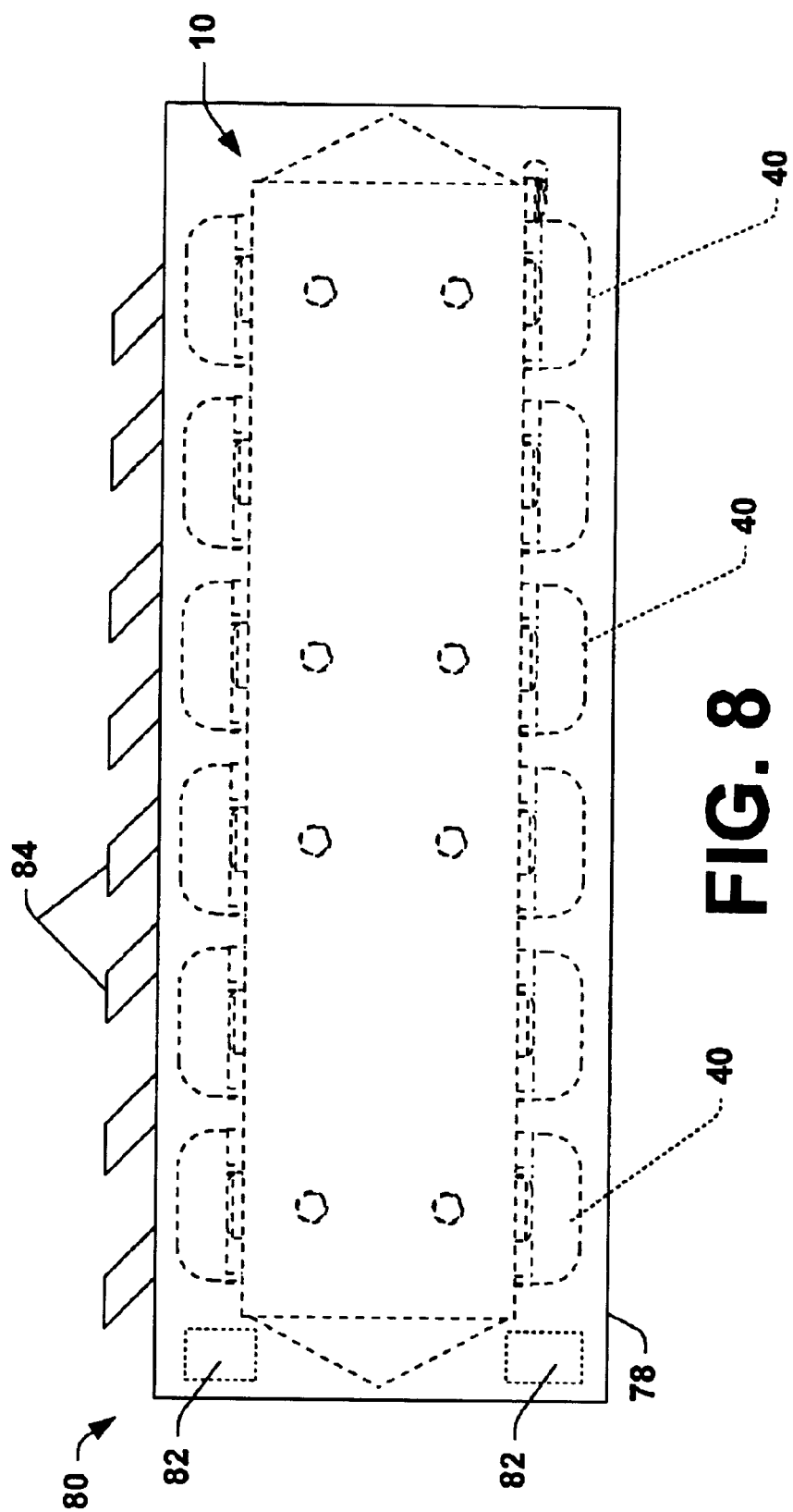
FIG. 8 is an example of an encapsulated motor assembly in accordance with the present invention.

An example of an encapsulated armature assembly 80 is illustrated in FIG. 8. The encapsulated assembly 80, for example, may be produced during an injection molding process in which the assembled armature assembly 10 is placed in a corresponding mold (not shown). The mold may include two mating parts that connect to provide have a generally rectangular shaped volume. The mold also may include heating rods, thermocouples, and water cooling channels operative to facilitate the injection molding process. Sensors and/or other electronic components 82 also may be placed in the mold to form part of the resulting encapsulated assembly 80. In addition one or more protrusions 84, such as dimples or fins, may be molded into the outer covering 78 to increase its exposed surface area and further facilitate heat dissipation when the windings are energized.

By way of illustration, heating rods or other heating elements may be used to preheat the motor to about 250° F. and the mold to about 275° F. A molten thermoplastic material is heated to a temperature of about 6000° F. and applied into the mold, such as by injection molding. The thermoplastic material 78 quickly dissipates heat during application so as to reduce its temperature to slightly above the temperature of the mold due to heat transfer. As a result of the heat dissipation, damage to insulation that surrounds the conductors of the windings is mitigated. After a sufficient amount of material is applied into the mold, the mold is kept closed to allow initial curing of the injected encapsulating material which may take from about three to about ten minutes. The encapsulated assembly then may be kept at an elevated temperature to facilitate proper curing. Those skilled in the art will understand and appreciate other ways in which the thermally conductive encapsulating material may be applied over an armature assembly in accordance with an aspect of the present invention.

Figure 9:
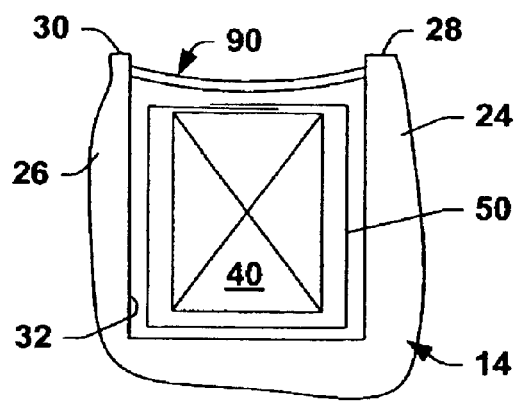
FIG. 9 is a partial sectional view of part of a motor of FIG. 1, illustrating another retaining system that may be employed in accordance with the present invention.

FIG. 9 illustrates an alternative version of a retaining plate 90 in accordance with an aspect of the present invention, in which identical reference characters refer to parts previously identified. In this example, a concave retaining plate 90 is positioned in the slot 32 above the windings 40 near the distal ends 28 and 30 of respective teeth 24 and 26. The concave plate 90, for example, is a flexure formed of a resilient material, such as spring steel. The plate 90 has a width that is slightly greater than the width of the slot extending between the teeth 24 and 26. Accordingly, when inserted into the slot, side edges of the plate 90 bend or flex relative its longitudinal axis to approximate the dimensions and configuration of the slot 32. The side edges of the plate 90 thus engage the sidewalls of the teeth 24 and 26 so as to maintain a desired position. Instead of being inserted into the slot 32 from a side of the core 14, the concave plate 90 may be inserted from above. Because the concave plate may frictionally engage the sidewalls to maintain its desired position, grooves are not required. However, small grooves can be formed in the teeth 24 and 26 near the upper ends 28 and 30, respectively, similar to those shown and described with respect to FIGS. 1–5, such as to facilitate locking the side edges of the plate 90 relative to the teeth 24 and 26.

Figure 10:
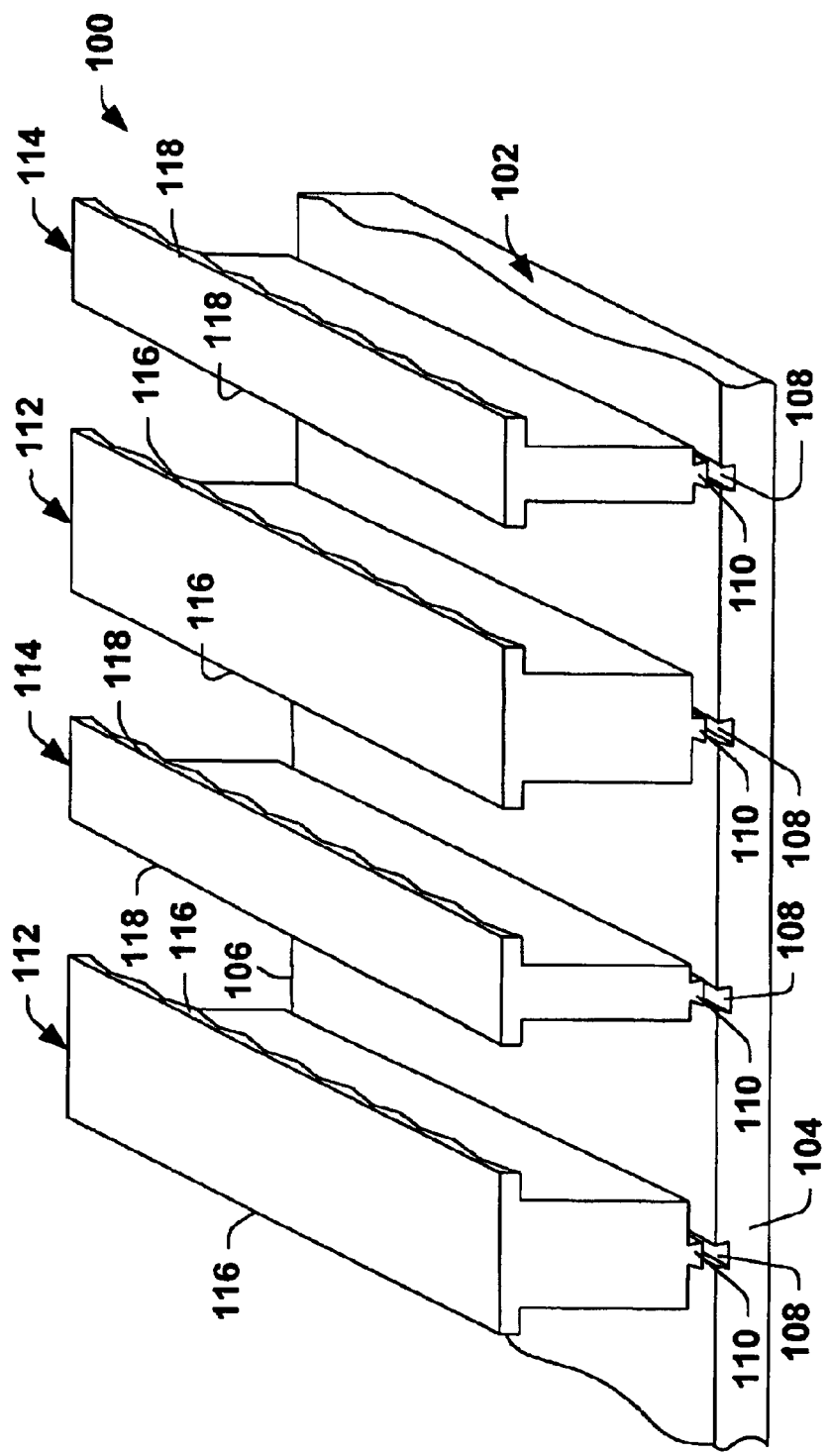
FIG. 10 is an exploded isometric view of an example of part of a motor core in accordance with the present invention.
Figure 11:
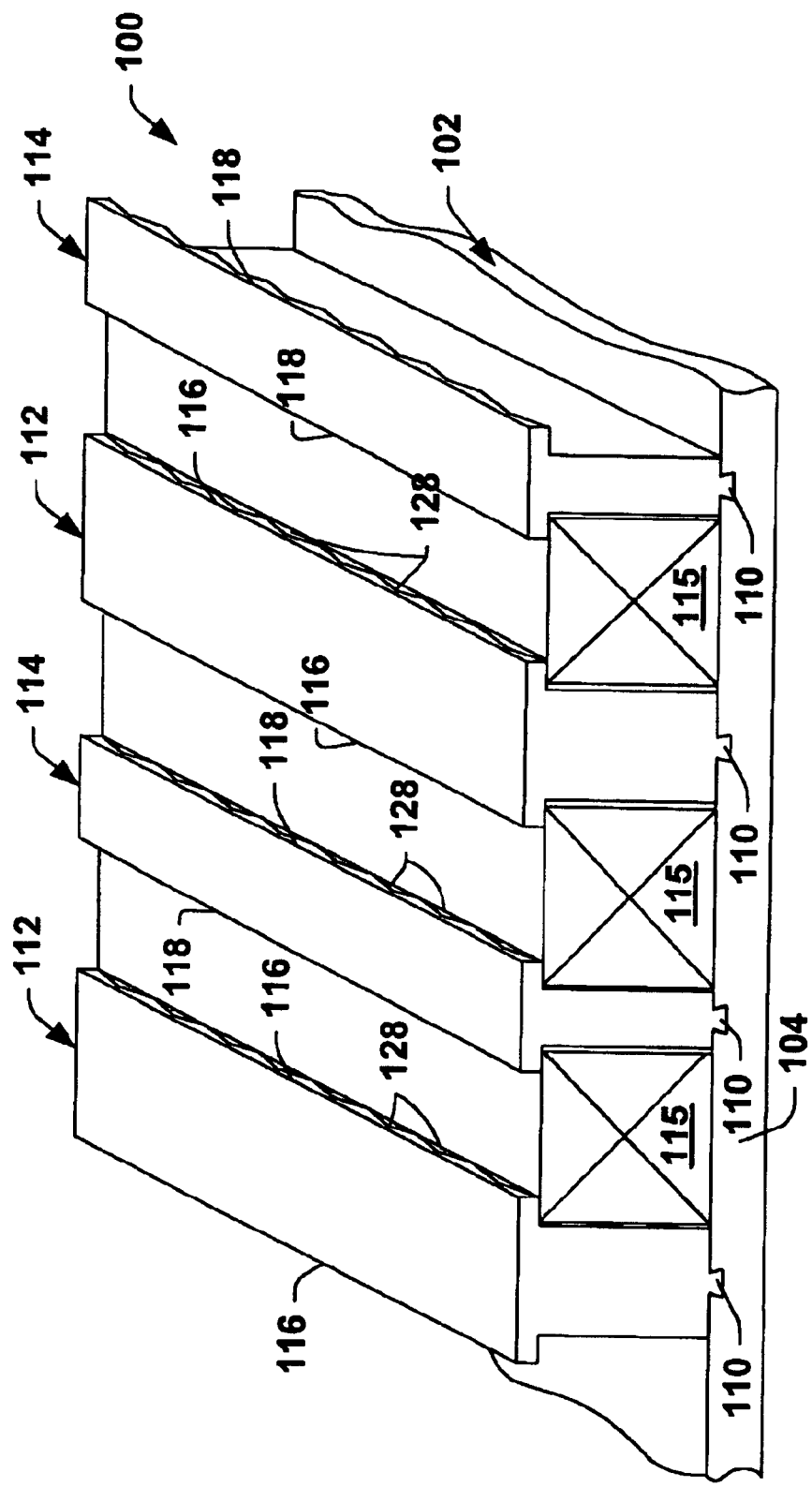
FIG. 11 is an exploded isometric view, similar to FIG. 10, illustrating an example of part of a motor assembly with windings in accordance with the present invention.

FIGS. 10 and 11 illustrates an example of part of a core 100 of an armature assembly that may be employed to provide another type of retaining system in accordance with an aspect of the present invention. The core 100 includes a base 102, such as may be formed of generally flat laminations and/or of a powdered electrically conductive material (e.g., iron or an alloy thereof). The base 102 has side edges 104 and 106 that extend between ends (not shown). In the example of FIGS. 10 and 11, elongated receptacles 108 extend between the side edges 104 and 106 of the base 102. The receptacles 108 provide female parts operative to receive corresponding male parts 110 of associated teeth (or top sticks) 112 and 114.

Those skilled in the art will understand and appreciate other arrangements that could be employed for connecting the teeth 112 and 114 to the base 102. It is also to be appreciated that the location of the male and female mating parts may be different from that shown without departing from the spirit and scope of the present invention. For example, the base 102 could include the female parts and the teeth 112 and 114 could include the corresponding male parts.

Referring to FIG. 10, the teeth 112 and 114 are dimensioned and configured to extend coextensively between the side edges 104 and 106. The teeth 112 and 114 may be formed of a powdered metal material. In the example of FIGS. 10 and 11, the teeth 112 have a cross-sectional width that is greater than the other teeth 114 and may include magnetic core (not shown) similar to the core 36 (FIG. 1). The greater width of the teeth 112 enables them to provide a large electrically conductive substrate around which the windings 115 may be disposed, such as shown in FIG. 11. The windings 115 may be pre-wound assemblies or they may be wrapped around the teeth 112 in situ prior to (or after) their attachment with the base 102. The other teeth 114 are interposed between each set of the windings 115.

In accordance with an aspect of the present invention, laterally extending flanges 116 and 118 extend from a distal end of central base portions 120 and 122 of the respective teeth 112 and 114. Portions 124 and 126 and of the respective flanges 116 and 118 that face the base 102 include a non-planar surface, part of which may engage the windings 115 (or a corresponding slot liner (not shown)) when in the assembled condition, such as depicted in FIG. 11. By way of example, the non-planar portions 124 and 126 may be generally saw-tooth, sinusoidal, stepped, or other shapes operative to form spaces (or voids) 128 between the windings 115 and the flange portions 124 and 126. The spaces 128 thus permit the flow of encapsulating material between the non-engaging part of the flanges 116 and 118 and the windings 115. Those skilled in the art will understand and appreciate other configurations and arrangements that will permit desired flow of the encapsulating material. For example, detents or holes could be formed in part of the teeth 112 and 114 to provide corresponding places for the flow of encapsulating material so as to facilitate its attachment to the armature assembly.

Figure 12:
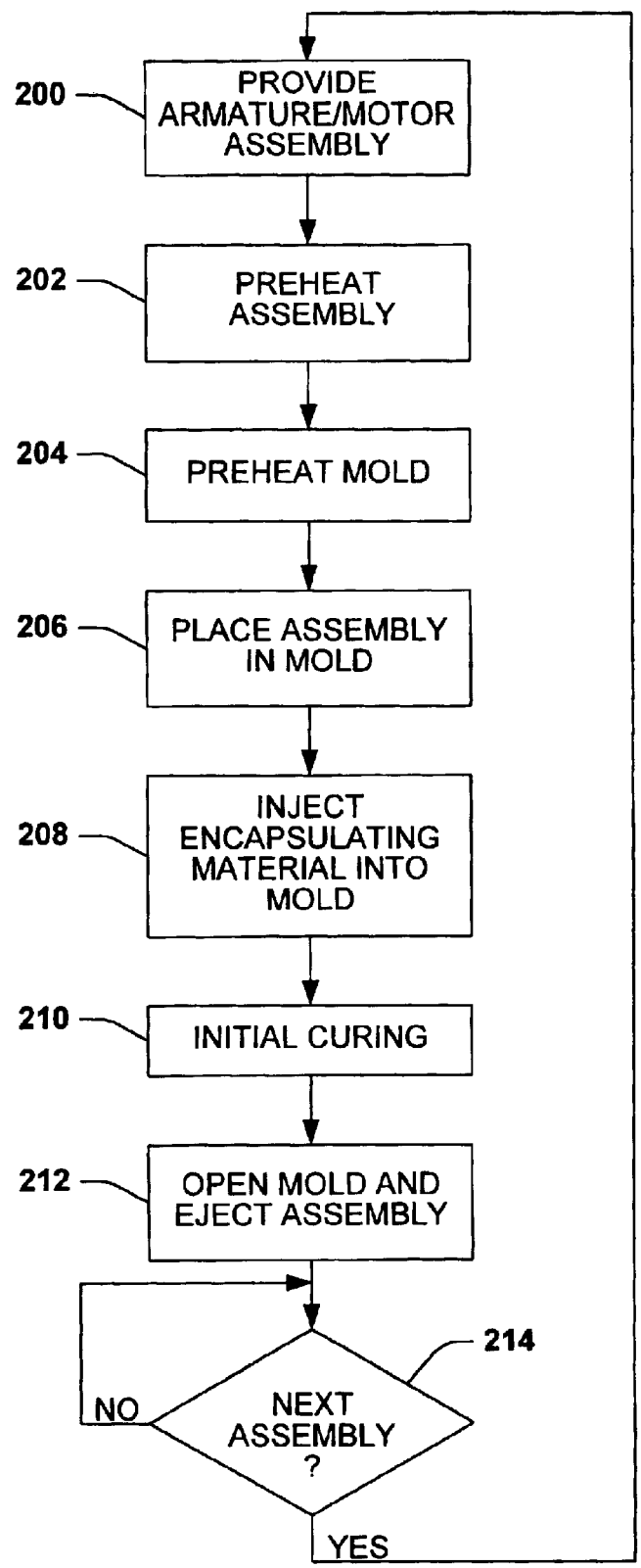
FIG. 12 is a flow diagram illustrating a methodology for encapsulating a motor in accordance with the present invention.

In view of the foregoing structural and functional features described above, a methodology for constructing an encapsulated armature winding assembly in accordance with the present invention will be better appreciated with reference to FIG. 12. While, for purposes of simplicity of explanation, the methodology of FIG. 12 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

The methodology begins at 198 in which an armature and/or motor assembly is constructed. An armature assembly, for example, includes a core of an electrically conductive material and windings disposed around selected teeth (or top sticks) of the core. Other types of motors (e.g., linear or rotary) could be encapsulated according to the methodology. In accordance with an aspect of the present invention, the armature assembly includes structure that retains the windings at a desired position in relative to the teeth. Examples of different mechanisms that could be employed to retain the windings at desired positions are shown and described with respect to FIGS. 1, 9, and 11. Those skilled in the art will understand other retaining systems that could be employed to accomplish a similar function. In accordance with a particular aspect the retaining system includes corrugations or other means (e.g., detents, holes, fins, etc.) that provide voids or structure to which the encapsulating material may anchor upon curing. The corrugations, such as associated with a retaining plate of a generally rigid material, further increases the strength of the plate and, thereby, help inhibit movement and/or expansion of the windings out of the slots, such as tends to occur when energized. Various diagnostic tests can also be performed to help ensure proper assembly and configuration prior to completing the assembly.

At 200, a layer of a varnish material can be applied to the assembly. By way of example, the motor is preheated to a temperature of about 200 to about 250° F. for about an hour. The assembly is the cooled to about 150° F. The electrically insulating varnish material is then applied to the assembly, such as by immersion into a tank containing the varnish. The tank is vacuumed down to help the varnish to adhere to the assembly. After excess varnish is removed from the motor assembly, the varnish is appropriately cured, such as in an oven at an increased temperature for suitable time period.

Next, at 202, the assembly is preheated, such as to a temperature of about 250° F. The mold also is heated (204) to a suitable temperature, such as to about 275° F. As mentioned above, the mold may contain thermocouples or other temperature sensing devices to monitor and regulate the temperature of the mold during the injection molding process. The elevated temperatures facilitate the flow of the encapsulating material around the assembly and into the open spaces and voids associated the assembly. The preheated assembly is placed into the preheated mold at 206. By way of example, the mold is formed of two main parts that are urged together to form a cavity having desired dimensions and configuration for encapsulating the assembly. Appropriate mechanisms may be provided for positioning the assembly at a desired central location within the cavity defined by the mold. The mold also may include a channel machined into the mold to encapsulate part of the motor power cable within the same encapsulation as the rest of the assembly. Additionally or alternatively, the mold may include voids into which the injected material may flow to form protrusions on the assembly to further facilitate heat dissipation from its outer covering.

After the mold is closed around the assembly, the methodology proceeds to 208 in which a thermally conductive encapsulating material is injected into the mold. By way of illustration, the encapsulating material may be heated within an injection barrel to suitable temperature (e.g., about 600° F.) to liquefy the material. The encapsulating material, for example, may be a thermoplastic material having a high thermal conductivity (e.g., greater than about 0.5 W/mK), such as described above. Those skilled in the art will understand and appreciate various other acceptable encapsulating compounds that may be utilized in accordance with the present invention. In accordance with a particular aspect, the molten material flows into spaces or voids, such as associated with the retaining system. Because of the temperature differential between the injected material and the mold and assembly, the injected material tends to significantly dissipate heat before contacting the windings. As a result, insulation around the conducting wires of the windings should not be damaged. Even though there may be some shrinkage of the injected material upon cooling, the flow of material into such spaces mitigates movement of the windings relative to the teeth.

Next, at 210, the injected material begins its initial curing, which may occur in a matter of about two to about ten minutes (e.g., three minutes). After sufficient curing has occurred, the methodology proceeds to 212 in which the mold is opened and the encapsulated assembly is ejected from the mold. The encapsulated assembly may be kept at an elevated temperature during a cooling period to properly cure the injected material, which curing may occur in about twenty-four hours.

In view of the foregoing, it will be appreciated that injection molding (as contrasted to epoxy encapsulation) facilitates the manufacturing of each assembly. For example, where an epoxy encapsulation may have taken about forty-five minutes, injection molding may take from about three to about ten minutes. In addition, injection molding enables the manufacturer to mold a name and/or logo directly on the encapsulation. Significantly, thermally conductive plastics also may exhibit superior heat transfer characteristics relative to traditional epoxy.

Figure 13:
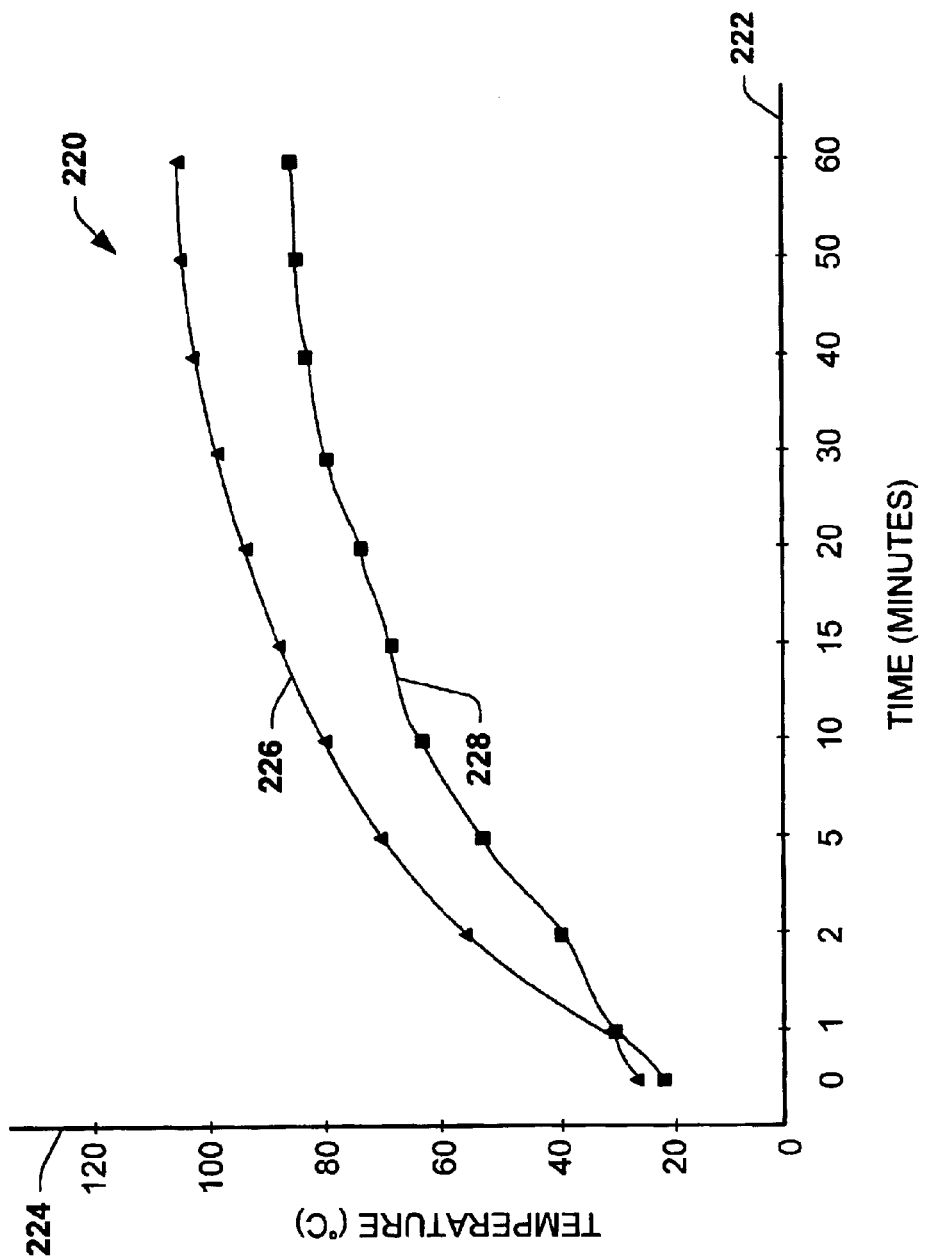
FIG. 13 is a graph of time versus temperature, illustrating temperature characteristics for different types of encapsulated motors.

By way of example, FIG. 13 is a graph 220 plotting time on one axis 222 versus the temperature in ° C. on the other axis 224. The graph 220 includes a plot 226 of the temperature characteristics of an armature assembly encapsulated in epoxy operating with an input current of 5 amps. The graph also includes a plot 226 of the temperature characteristics of an armature assembly encapsulated in a conductive thermoplastic, also operating with an input current of 5 amps. As represented in the graph 220, the thermoplastic encapsulation provides a lower operating temperature of about 30° C. for an operating time period of about one hour. As a result, a greater amount of force and/or acceleration may be achieved with a given motor that is encapsulated by a thermoplastic material in accordance with an aspect of the present invention.

What has been described above includes exemplary implementations of the present invention. Because it is not possible to describe every conceivable combination of components or methodologies for purposes of describing the present invention, one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An armature assembly for a motor, comprising:
   a core having a plurality of spaced apart teeth that define slots between adjacent teeth;
   windings disposed in associated slots around at least some of the teeth;
   a retaining system operatively associated with distal ends of the teeth to retain the windings within the associated slots; and
   the retaining system including a non-planar surface that interfaces with the windings to define at least one void that permits flow of an encapsulation material into the void so as to facilitate attachment of the encapsulation material with the assembly.

2. The assembly of clam 1, wherein the retaining system further comprises an elongated retaining plate positioned in each of the associated slots near the distal ends of associated teeth.

3. The assembly of claim 2, further comprising elongated grooves extending through the associated teeth between side edges thereof near the distal ends, one of the retaining plates being received within a pair of the grooves in each of the associated slots.

4. The assembly of claim 3, wherein the retaining plate further comprises the non-planar surface.

5. The assembly of claim 3, wherein the retaining plate further comprises a corrugated sheet of a substantially rigid material.

6. The assembly of claim 2, further comprising at east one aperture extending through the retaining plate to facilitate flow of the encapsulation material into a space between the retaining plate and the associated windings.

7. The assembly of claim 1, wherein the teeth further comprise T-shaped teeth extending from a base of the core and terminating in the distal end thereof, the distal end of each of the T-shaped teeth defining flange portions that extend over part of adjacent slots to define at least part of the retaining system.

8. The assembly of claim 7, wherein an adjacent surface of the flange portions above the adjacent slots further comprise the non-planar surface to facilitate flow of the encapsulation material into a void defined by the adjacent surface of the flange portions and the associated windings.

9. The assembly of claim 8, wherein the non planar surface of each of the flange portions further comprises corrugations to facilitate flow of the encapsulation material between the flange portions and associated windings.

10. The assembly of claim 7, wherein each of the T-shaped teeth further comprise a proximal end spaced apart from the distal end, which proximal end is configured to matingly connect with a corresponding part of the base.

11. The assembly of claim 1, further comprising a sheet flexible liner of an electrically insulating material covering at least a substantial part of each of the windings disposed within the associated slots to separate the windings from the core.

12. The assembly of claim 11, wherein each sheet further comprises opposed end portions that are folded toward each other over an end of windings near the distal end of the teeth within the slot so as to circumscribe the part of each of the windings disposed within the associated slots.

13. The assembly of claim 1, the encapsulation material comprising an injection molded material.

14. The assembly of claim 13, the encapsulation material further comprising a varnish material applied to the armature assembly, the injection molded material being applied to the armature assembly over the varnish material.

15. An armature assembly for a linear motor, comprising:

a core having a generally rectangular base;

teeth that extend from the base and terminate in a distal end, the teeth being spaced apart from each other and extending longitudinally between opposed sides of the base to define elongated slots between adjacent teeth;

at least one set of windings surrounding at least one of the teeth;

an outer covering of an injection molded material encapsulating at least a substantial part of the core and windings to help maintain the windings within the slots; and a layer of a varnish material applied to the core and the windings, the outer covering being applied over the varnish, which encapsulates at least a substantial part of the core and windings.

16. The assembly of claim 15, wherein the injection molded material further comprises a thermally conductive polymer having a thermal conductivity of greater than about 0.5 Watts per meter Kelvin.

17. The assembly of claim 16, further comprising protrusions of the thermally conductive polymer molded in situ onto an outer surface of the outer covering to improve beat dissipation from the outer covering when the windings are energized.

18. The assembly of claim 15, further comprising a retaining system operatively associated With the distal ends of the teeth and including a non-planar surface to define at least one void which permits flow of the injection molded material into the void so as to facilitate attachment of the outer covering with the assembly.

19. The assembly of claim 18, wherein the retaining system further comprises an elongated sheet of a substantially rigid material positioned in each of the associated slots near the distal end of associated teeth to help hold the windings in the associated slots.

20. The assembly of claim 19, further comprising elongated grooves extending along at least a substantial portion of length of the teeth near the distal ends thereof, one of the elongated sheets being received within a pair of the grooves associated with each of the associated slots.

21. The assembly of claim 20, further comprising at least one aperture extending through each of the elongated sheets that defines an opening to a space between each respective elongated sheet and the windings in the associated slot, some of the plastic material extending through the opening and into the space.

22. The assembly of claim 18, wherein the distal end of the teeth further comprise T-shaped flange portions, each of the flange portions extending over part of an adjacent one of the associated slots to for part of the retaining system.

23. The assembly of claim 22, wherein an adjacent surface of each of the flange portions f comprises the non-planar surface that interfaces with associated windings to provide voids between the flange portion and the associated windings, some of the plastic material extending into the voids to facilitate attachment of the plastic material.

24. The assembly of claim 22, wherein each of the teeth further comprises a proximal end spaced apart from the distal end, the proximal end matingly attaching with a corresponding part of the base.

25. The assembly of claim 15, further comprising a sheet of a flexible material covering at least a substantial part of each of the windings disposed within the associated slots to separate the windings from sidewalls of the teeth.

26. The assembly of claim 25, wherein each of the sheets of the flexible material further comprises opposed end portions that are folded toward each other over an exposed surface of the windings within the associated slot so as to surround at least part of the respective windings disposed within the associated slot.

* * * * *